United States Patent
Fiegert et al.

(10) Patent No.: US 6,240,342 B1
(45) Date of Patent: May 29, 2001

(54) PATH PLANNING PROCESS FOR A MOBILE SURFACE TREATMENT UNIT

(75) Inventors: Michael Fiegert, München; Jörg Helbach, Münsingen; Gisbert Lawitzky, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/601,464

(22) PCT Filed: Feb. 3, 1999

(86) PCT No.: PCT/DE99/00286

§ 371 Date: Aug. 2, 2000

§ 102(e) Date: Aug. 2, 2000

(87) PCT Pub. No.: WO99/40496

PCT Pub. Date: Aug. 12, 1999

(30) Foreign Application Priority Data

Feb. 3, 1998 (DE) .............................. 198 04 195

(51) Int. Cl.[7] .............................. G01C 22/00; G05D 1/00
(52) U.S. Cl. .............................. 701/25; 701/209; 701/23; 901/1; 180/169
(58) Field of Search .................. 701/25, 1, 209, 701/23; 901/1; 180/169

(56) References Cited

U.S. PATENT DOCUMENTS

| 4,700,427 | 10/1987 | Knepper . |
| 4,706,200 | 11/1987 | Kishi et al. . |
| 5,602,748 | 2/1997 | Seki et al. . |
| 6,102,147 | * 8/2000 | Shimizu et al. ............ 180/204 |
| 6,167,332 | * 12/2000 | Kurtzberg et al. ............ 701/23 |

FOREIGN PATENT DOCUMENTS

| 0 335 975 | 10/1989 | (EP) . |
| 0 402 764 | 12/1990 | (EP) . |
| 0 564 854 | 10/1993 | (EP) . |

OTHER PUBLICATIONS

Path Planning And Guidance Techniques For An Autonomous Mobile Cleaning Robot—Hofner et al No. 8393 Jul. 4, 2000.

* cited by examiner

Primary Examiner—William A. Cuchlinski, Jr.
Assistant Examiner—Olga Hernandez
(74) Attorney, Agent, or Firm—Schiff Hardin & Waite

(57) ABSTRACT

In a path planning method is disclosed for surface processing machines such as, for example, cleaning machines in a supermarket first, potential sub-paths are produced that, proceeding from boundary lines of obstacles or the work area parallel to these boundary lines shifted by the width of the processing device are erected in the form of concentric circles. These potential sub-paths are then sub-divided by maneuvering marks according to an heuristics, for example on the basis of the maneuverability of the mobile unit, and are connected to one another by sub-paths. The respective sub-paths are subsequently evaluated with a cost function that considers the distances, the area already covered, and the maneuverability of the unit, and the most cost-beneficial path is combined to form a planned path for the mobile unit. Preferably, sub-paths between the maneuvering marks are interpreted as graph edges and the maneuvering marks are interpreted as nodes and are evaluated with known evaluation methods for generating optimum graphs. Areas of employment are cleaning robots for supermarkets, lawnmowers, or painting devices and the like.

12 Claims, 3 Drawing Sheets

PATH PLANNING PROCESS FOR A MOBILE SURFACE TREATMENT UNIT

BACKGROUND OF THE INVENTION

The invention is directed to a method with which a mobile unit can be controlled on a working surface locked by obstacles such that a work device attached to it covers the remaining surface as completely as possible.

Repetitive activities are being transferred more and more often to service robots. Examples of such activities are cleaning tasks, transport tasks, dispersing seed or, for example, lawn mowing. Given service robots to which surface processing devices are attached, there is the problem that this surface processing device should cover the entire space available as completely as possible, whereby optimally few paths should be traveled twice. The expense for the planning of this path should thereby also be so low that little computing capacity need be employed for this purpose, so that an accessible time behavior can be assured in the planning process. Given a cleaning robot that, for example, is intended to carry out cleaning jobs in a supermarket, the additional problem is comprised therein that, when it is utilized at the time the store is open, additional obstacles in the form of customers with grocer carts occur, and that the path traveled by the robot should be so predictable that the customers are not frightened by the cleaning robot. When the dimensions of the work and the obstacles present therein are known in terms of their position, an optimum path can be planned with the assistance of an advance traversal, traveling this path requiring little time and thereby taking as much of the surface to be covered into consideration as possible. Although path planning methods for autonomous mobile units are already known in the prior art, the topic of planning surface-covering paths has already been sporadically discussed therein: "Path Planning and Guidance Techniques For An Autonomous Mobile Cleaning Robot" by Christian Hofner and Gunther Schmidt, published in Proceedings of the Intelligent Robots and Systems IROS '94, Munich, Sep. 12–16, 1994, pages 610 through 617.

SUMMARY OF THE INVENTION

An object underlying the invention is comprised in specifying an improved path planning method for a mobile unit for surface processing.

According to the present invention, a path planning method is provided for a mobile unit for surface processing. The contour line of the processing surface and at least the contour line of an obstacle to be traveled around the processing surface is provided in the form of a closed line train composed of straight line sections connected in kinks. Dependent on a width of a surface processing device attached to the mobile unit, first, potential paths with the processing width are planned essentially parallel to the contour lines that allow the mobile unit to guide the surface processing device along the processing strip which has arisen in this way between the first potential path and the contour line. In a further planning step, planning second potential paths in a same way as the first potential paths with the first potential paths as contour lines. The potential paths are divided into potential sub-path segments dependent on a length of kinks in the contour lines between which a respective maneuvering mark is marked. At least two respective maneuvering marks of immediately adjacent, potential paths are connected by potential sub-path segments. The path is planned from interconnected, potential sub-path segments in that these are weighted with a cost function into which at least one of the following cost criteria enters: transversability criterion on the basis of kinematics of the mobile unit, area criterion on the basis of processing strips already traversed in relationship to the overall processing area, and length of the potential sub-path.

Advantageously, the width of the work device is planned in a given application of the inventive method, so that a low number of potential paths are prescribed, these being advantageously subdivided into potential sub-path segments by maneuvering marks that are preferably arranged such that the mobile unit, on the basis of its kinematic givens, is unproblemmatically in the position to proceed from one maneuvering mark to the next maneuvering mark. In this way, an optimally low plurality of potential sub-path segments is prescribed, these having to be interpreted by an evaluation event and, accordingly, incurring an optimally low calculating expense.

In a development of the method, the work area is advantageously divided in the form of a grid, whereby the grid surface notes whether this is to be traversed by a sub-path segment that is to be planned, from which conclusions can be drawn as to whether this surface area has already been cleaned. This leads to the fact that the cost function for evaluating the respective sub-path segments can be adapted to this situation.

In a development of the proposed method, a check is preferably carried out before the planning of a potential path as to whether this adheres to a minimum spacing from further contour lines, since producing unnecessary, potential sub-paths is avoided in this way because such potential sub-paths are likewise already produced proceeding from other contour lines. In this way, the calculating expense is to be reduced in the planning and evaluation of the path that is to be traversed by the mobile unit.

In a development of the proposed method, one advantageously continues with generating potential paths until a spacing criterion with respect to a contour line has been downwardly crossed, since it is assured in this way that the entire, remaining work area is penetrated by potential paths and it is simultaneously assured that an excessive number of potential paths are not produced.

In a development of the proposed method, a direction is advantageously prescribed for the individual sub-paths, since it can be assured in this way that surface processing devices arranged laterally at a mobile unit can be conducted along the contour line.

In a development of the proposed method, a potential path at potential sub-path segments are advantageously generated in that the line segments of the contour line are simply perpendicularly shifted by the amount of the width of the surface processing device, and the end points of the sub-path segments that have arisen in this way are connected by further sub-path segments. This method is simple to program and produces its potential sub-paths and potential paths with maneuvering marks in a simple way that can be easily traversed by a mobile unit.

In a development of the proposed method, the sub-path can be advantageously represented in the form of edges of a graph and the maneuvering marks can be advantageously represented as nodes of a graph; graph-theoretical fundamentals can thus be utilized. A great variety of possibilities for constructing optimum graphs and for evaluating individual edges of these graphs are already present therein.

Advantageously, the path to be crossed by the mobile unit is implemented by a weighted depth search of the edges of the graph, since good path courses can be found in this way using little calculating expense and, thus, using small computers as well.

Advantageously, the maneuvering marks are presented in the form of configurations of the mobile unit as coordinates plus direction, whereby the same reference point at the mobile unit is always employed.

Exemplary embodiments of the invention are explained in further detail below with reference to the drawings figures.

DESCRIPTION OF THE PREFERRED EMBODIMENTS

Figure 1:
FIG. 1 is a configuration of a mobile unit.
Figure 2:
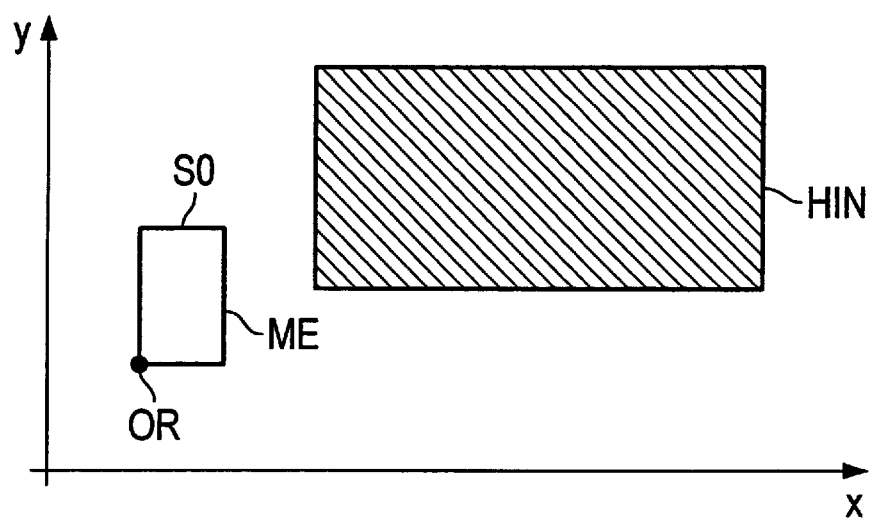
FIGS. 2 and 3 show a mobile unit with an obstacle.
Figure 3:
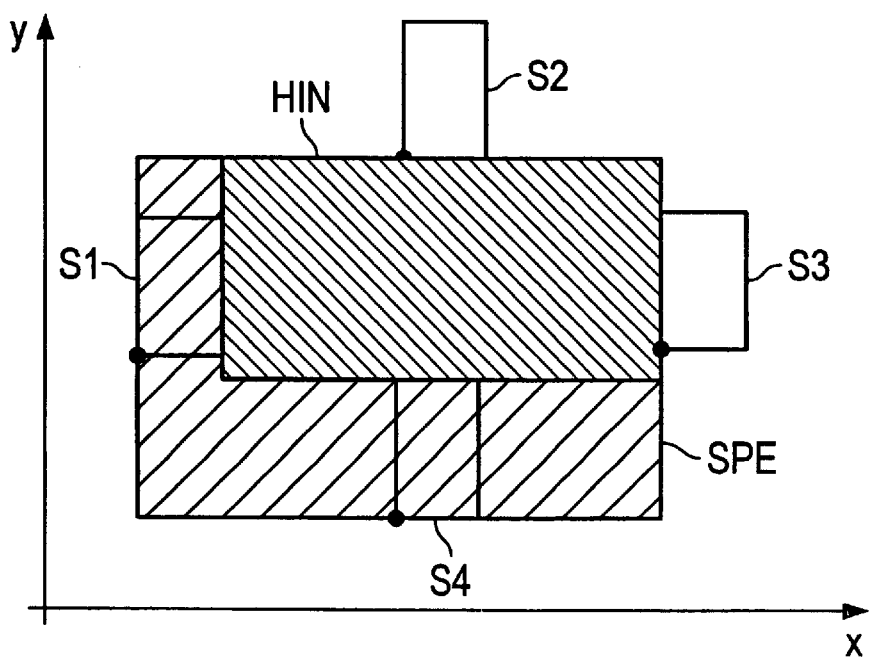

As FIG. 1, shows a configuration K of an autonomous mobile unit can be indicated by means of an origin OR and a direction RI, whereby the origin is recited in the form of Cartesian coordinates. Since mobile units can usually not be arbitrarily moved, i.e. they cannot be turned around their upward ordinate axis or, respectively, cannot travel sideways, there are minimum criteria that must be taken into consideration with respect to the maneuverability of the mobile units. FIGS. 2 and 3 thereby illustrate how an individual reference mark in the form of an origin OR of a configuration at a mobile unit ME can be employed, whereby it is simultaneously assured that a surface processing device that is attached to the unit can be completely guided along an obstacle contour line HIN. FIG. 2 thereby shows the obstacle contour line HIN, the mobile unit ME, and the configuration origin OR thereof in a Cartesian coordinate system. FIG. 3 illustrates an obstacle contour line SPE along which the origin of the mobile unit ME can be conducted without having this collide with the obstacle contour line HIN. Four different motion stages of the mobile unit ME in the form of S1 through S4 are shown with respect thereto. The designations ME and OR are not recited but are identical to those in the condition S0. Given application of the proposed method, it is thus meaningful when work is only carried out with a coordinate reference point for the configuration of the mobile unit instead of employing the obstacle contour line HIN and the obstacle contour line SPE, since a collision of the mobile unit with an obstacle is thereby automatically precluded.

Figure 4:
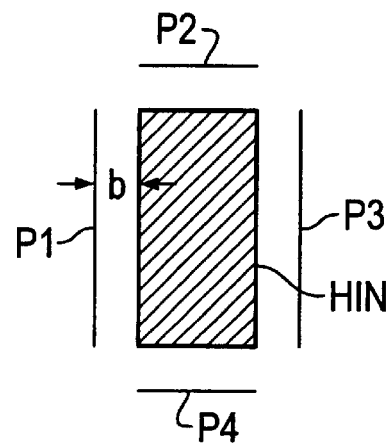
FIGS. 4 through 6 show the structure of potential paths.
Figure 5:
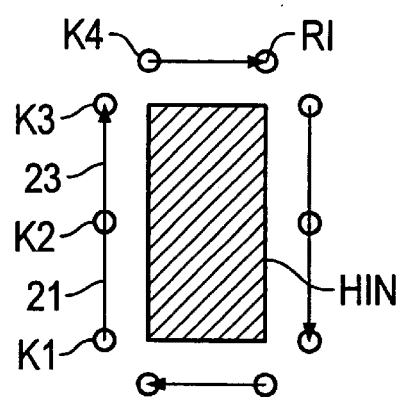
Figure 6:
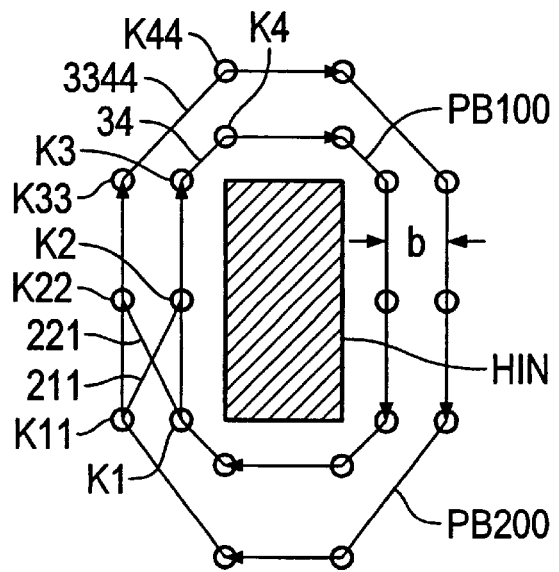

As FIGS. 4 through 6 show, potential paths that are to be traveled by the mobile unit should be constructed according to a simple pattern. First, as FIG. 4 shows, the line segments of the obstacle contour line HIN are shifted perpendicularly by the amount of the width of the surface processing device, parallel line segments P1 through P4 arising therefrom. The length of the line segments is thereby retained, and the amount b of the processing width is preferably selected such that a desired overlap of processing paths is also thereby taken into consideration. As FIG. 5 also shows, configurations K1, K3 and K4 are generated at the end of these line segments. For example, these configurations can be nodes of a graph and can serve as maneuvering marks for the mobile unit; optionally, it can also be provided that intermediate configurations—as indicated here with K2—are assigned in order to make an adequate plurality of maneuvering marks available to the mobile unit so that this does not deviate too far from a predetermined path. In FIG. 5, edges 21 arise in this way between the nodes K1 and K2, and edges 23 arise between K2 and K3. An arrow likewise indicates a direction RI in which the mobile unit should preferably travel around the obstacle contour line HIN.

FIG. 6 shows a further step in constructing potential paths for the proposed path planning method. These potential paths are placed around the obstacles in the form of concentric circles and are consecutively numbered. Two examples in FIG. 6 are PB100 and PB200. For the sake of clarity, only the nodes K1 and K4 of the path from FIG. 5 are still shown here, and further nodes K11 through K44 of a second potential path have been produced. As can be recognized, this has likewise been produced by shifting the line segments of the original obstacle contour line perpendicular to the first potential path by the amount of the processing width b. In the proposed method, a number is preferably assigned for each potential path, so that it can be assured that individual configurations or, nodes of the arising graph can be connected by edges between the potential paths having different numbering. In FIG. 6, the second potential path comprises, for example, configurations K11, K22, K33 and K44 that, for example, are connected by sub-path segments or edges of a graph, as shown here between the nodes K33 and K44 and referenced 3344. The edge or, respectively, the sub-path segment 3344— dependent on whether a potential path or a graph is being considered—connects those sub-segments that originally met one another at the obstacle contour line HIN at a kink. Just as shown here, potential paths can have been produced as a limitation of the work area proceeding from an obstacle contour line. Preferably one continues with this procedure until a potential path downwardly crosses the processing distance from a further obstacle contour line, since it is assured in this way that optimally many potential paths are produced and the entire work surface is penetrated by such potential paths with their sub-path segments. The interpretation of the sub-path segments and of the configurations as nodes and edges of a graph thereby has the advantage that there are already the greatest variety of methods in mathematical graph theory in order to generate optimum graphs or, respectively, edges of graphs weighted in view of different weighting functions. In order to connect potential paths produced in this way with one another, it is necessary to connect potential paths with different numbering by sub-path segments between individual nodes. This is shown here by the sub-path segments or, edges 221 or, 211. In view of producing these connecting sub-paths between the potential paths with different numbers, the greatest variety of criteria are conceivable with which one can control which nodes are to be connected to one another. For example, these can be spacing criteria, whereby the Euclidean distance or, the kinematic distance is calculated and a threshold is prescribed for this. However, combinations can also be possible wherein, for example, one criterion plays a part that the mobile unit should be able to reach the next node or, the next maneuvering mark by traveling straight ahead. Further, for example, minimum radii to be traveled by the machine can play a part in the evaluation of connecting lines that can be produced between individual configurations. After this procedure has been successively retained for the entire working surface, one obtains a working surface that is penetrated by potential paths, whereby these potential paths are divided into potential sub-paths that connect configurations or, respectively, nodes of a graph to one another. Further, a different numbering of individual, potential paths assures that all of these potential paths are connected to one another with the assistance of potential sub-paths, so that all potential paths that proceed from different obstacle contour lines are connected to one another. For the path planning method of the optimum paths for the surface processing device, thus, the only thing available at the end are sub-paths from which the optimum paths in view of specific evaluation criteria to be met can be selected in order to plan an ultimate path for the mobile unit. When planning this path, the greatest variety of motion criteria are thereby to be taken into consideration in detail such as, for example, the motion direction of the customer, the overlap between the individual, potential paths, the fact that optimally little of the area should be traversed twice, the fact that attractive paths and understandable paths should be traveled that do not disturb customers in a supermarket, the curve radius of the mobile unit should be taken into consideration and the minimum width for traveling through can play a part.

Figure 7:
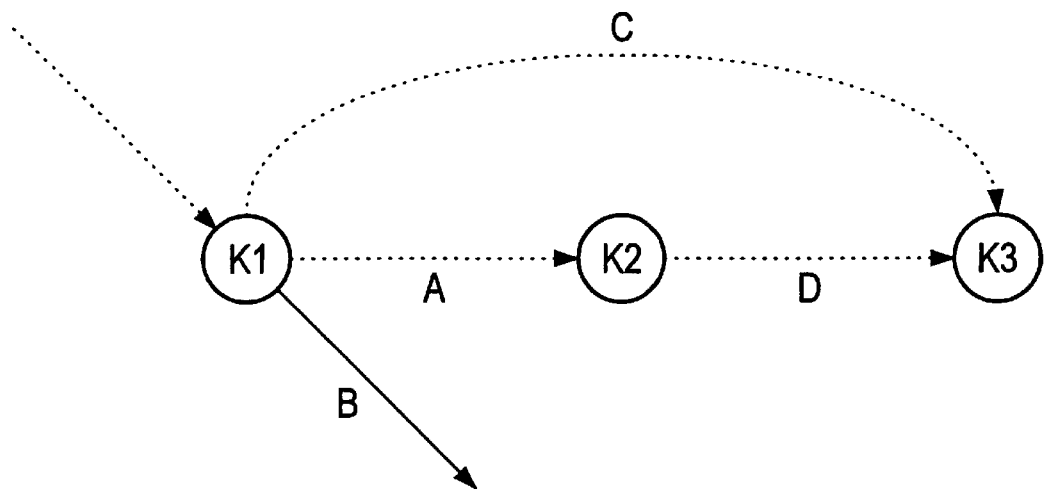
FIG. 7 illustrates the employment of meta-edges.

Preferably, a start mark forms the point of departure for the path to be planned; an arbitrary start mark within the processing surface can be defined for this purpose or, on the other hand, a configuration that was generated in the path planning can serve as a start mark for the beginning of the path planning. Preferably, the available work surface can be subdivided by a grid, whereby a node is made for the respective grid area that this is intersected by a sub-path, so that it is clear that the respective grid area was already cleaned if this sub-path is traveled. This situation can then serve the purpose that further path courses are newly planned dependent on grid cells have already been covered. Or, respectively, that the further path course is newly interpreted dependent on grid areas that have already been cleaned. The length of the planned path represents a further weighting factor. A meaningful possibility for storing the path is supplied by employing a directed path. The directed edges of this graph represent the connection between two configurations. Auxiliary information such as costs can thereby be very easily added. The employment of a graph structure has the advantage that little memory space is required. For evaluating the individual edges in the planning of the path, for example, the occupation or, the identification that a grid area was already cleaned can occur in an array. An essential criterion in the interpretation of sub-paths or, respectively, graph edges that connects two potential paths transversely relative to one another can be comprised therein that the mobile unit can easily switch from one configuration on the one potential path into the other configuration on the other potential path. Configurations that have been produced can also preferably be in turn deleted in the proposed method when these lie too close to another obstacle contour line. Further, configurations can be deleted that have a disturbing influence in view of the kinematics of the mobile unit. These can preferably be configurations that lie within a minimum curve radius of the mobile unit. Further, configurations can be deleted from which no further sub-path departs, since one should avoid having the mobile end up in a dead end and being required to travel in reverse. After potential sub-paths have been produced, each individual edge is evaluated with the assistance of a search algorithm that, for example, is the Greedy algorithm or the weighted depth-search algorithm, whereby the criteria for the evaluation of the respective edges of the sub-paths are freely prescribable. An evaluation of the sub-paths or, respectively, of the edges of the graph was experimentally implemented given a depth search having a search depth of six. The time expenditure for the evaluation is considerably reduced with this procedure. However, the path loses some of its optimum nature since the case can occur that the edges within a specified search depth have already all been cleaned, so that no path that leads to an uncleaned edge can be found with the assistance of the depth-search algorithm. This procedure also implies that, in addition to marking grid areas that have been cleaned, the respective path segments can be marked in view of the fact that they have already been traversed, which can also be noted in a memory of the mobile unit or, respectively, of the planning computer. In order to prevent sub-areas of the processing region that were not cleaned remaining at the end as a result of the evaluation of individual graph edges with the assistance of a depth-search algorithm because the step width of the depth-search algorithm does not suffice in order to proceed thereinto over individual edges, a procedure with the assistance of meta-edges is employed that is explained in further detail below in FIG. 7. The search depth for the depth-search algorithm is intended to be reduced with this meta-edge concept in that edges that have already been cleaned are combined to form a meta-edge. When an uncleaned edge is traversed, this edge is converted into a meta-edge. Following thereafter, an algorithm is run whose graph of the meta-edges is renewed. For this purpose, this algorithm is run respectively once for the start and end node of the edge that was just traversed. First, a check is carried out to see whether an edge that is not yet been tuned leads out from the respective node. When this is the case, then no action is carried out. When this is not the case, then all incoming meta-edges are operated with all out-going meta-edges and all incoming meta-edges are additionally deleted, so that the corresponding node can now be skipped. This situation is illustrated in FIG. 7. Here, the currently traveled edge A is converted into a meta-edge. Subsequently, node K, is checked. Since the edge B that departs from this node is still uncleaned, nothing is done at this point. Following thereupon, the node $K_2$ is checked. This node no longer contains any uncleaned edge, but only the meta-edge D. I.e., all incoming meta-edges are linked to all outgoing meta-edges according to the algorithm. In this case, thus, the edge A is connected to the edge D, and the new meta-edge C arises. In the next step, the edge A is additionally deleted, so that the node $K_2$ can be skipped. For the sake of completeness, it is also to be stated that the meta-edges in FIG. 7 are presented with the assistance of existing lines. What is achieved by this procedure upon employment of meta-edges is that the graph shrinks and, thus, search depth for the depth-the search algorithm suffices in order to locate small, unclean surface segments within a large cleaned area and to connect these with the assistance of meta-edges. It is thereby to be taken into consideration that the edges of the original graph that the respective meta-edges contain must be stored, so that, after the travel path was found by the depth search with the assistance of the meta-edges, the path can be planned along these original edges of the graph following thereupon. When the graph is composed of only one node, then it can be assumed that the processing area was completely traversed and that the planning can be aborted. A grid is preferably employed for checking the surface fill. For this purpose, the processing area is divided into grid areas by a grid in all grid areas are at first initialized as uncleaned. A region exists in the grid for each edge. This region is the area that is covered by the machine upon employment of the corresponding edge. Which region was traversed then can be calculated during the planning. The corresponding grid cells are entered as cleaned in a memory field for this purpose. One thereby obtains two numbers, the one thereby denoting an overall number of all grid cells and the second indicating the plurality of cells that have not yet been cleaned. The percentage of the area already cleaned can be determined from these two numbers. This percentage of area already cleaned can also be employed as an abort criterion for the path planning method.

Figure 8:
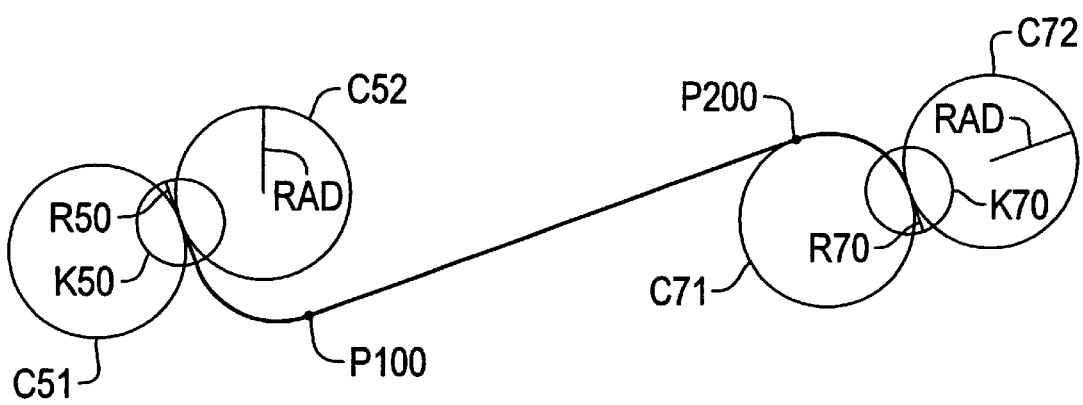
FIG. 8 illustrates the kinematic distance.

There is the greatest possible freedom in view of the cost function in the evaluation of the individual edges for linking these edges as path to be planned. For example, the cost function of each edge also has a value W that reflects the costs that must be exerted in order to change from a configuration K10 into a configuration K20. An allocation of costs to all edges of the graph must be undertaken for planning an optimum path. The costs of an edge can thereby be dependent on several factors. In this case, the costs are composed, for example, of a plurality of sub-aspects that can be differently weighted in the costs. Some influencing factors are, for example, the position of the edges, and the distance between two configurations, which should be optimally low so that imprecisions in the travel of the robot do not take excessive effect. Further, the Euclidean distance or, respectively, the kinematic distance can be evaluated that exists between two configurations that are to be traversed. In the calculation of the kinematic distance, respectively two circles are first placed around both configurations, as shown with C51 and C52, C71 and C72 in FIG. 8, these being respectively allocated to the configurations K50 and K70. R50 and R70 are indicated as travel directions in these two configurations. The radius of these circles RAD is thereby calculated such that the maximum steering angle of the mobile unit is utilized. Subsequently, the shortest connection of the configurations is calculated on the basis of these circles, in that favorable circle segments are connected by a link. These sub-circles between the configurations R50 and P100 and the configurations R70 and P200 and the path lying between P200 and P100 then form the kinematic distance. The relationship of these two, described distances can be formed as further criterion because this value states how large the steering angle of the mobile unit must be in order to reach the following configuration. Given the value of 1, the mobile unit can travel straight ahead, which, of course, represents the best case. The further important aspect in the evaluation of edges is the progress made in the surface processing. In order to calculate this, what percentage of the edge is already cleaned is determined. The benefit that can be achieved by traversing this edge is all the greater the smaller the value is at this point. All of these criteria or parts thereof can preferably be combined in the weighting function for the calculation of the costs for an edge. However, arbitrary other cost criteria are also conceivable dependent on the application. The energy consumption and supply as well as the supply of cleaning agent and consumption of cleaning agent, etc., can serve as examples.

Although various minor changes and modifications might be proposed by those skilled in the art, it will be understood that our wish is to include within the claims of the patent warranted hereon all such changes and modifications as reasonably come within our contribution to the art.

What is claimed is:

1. A path planning method for a mobile unit for surface processing, comprising the steps of:
   providing a contour line of the processing surface and at least a contour line of an obstacle to be traveled around within the processing surface in the form of a closed line train composed of straight line sections connected in kinks;
   dependent on a width of a surface processing device attached to the mobile unit, first, potential paths with the processing width are planned essentially parallel to the contour lines that allow the mobile unit to guide the surface processing device along the processing strip which has arisen in this way between the first potential path and the contour line;
   in a further planning step, planning second potential paths in a same way as the first potential paths with the first potential paths as contour lines;
   dividing the potential paths into potential sub-path segments dependent on a length of kinks in the contour lines between which a respective maneuvering mark is marked;
   correcting at least two respective maneuvering marks of immediately adjacent, potential paths by potential sub-path segments; and
   planning the path from interconnected, potential sub-path segments in that these are weighted with a cost function into which at least one of the following cost criteria enters: traversability criterion on the basis of kinematics of the mobile unit, area criterion on the basis of processing strips already traversed in relationship to the overall processing area, and length of the potential sub-path.

2. The method according to claim 1, whereby the processing surface is divided into a grid, and a node with respect to surface elements of the grid is undertaken as to whether these are intersected by a sub-path segment, which serves as surface criterion for said path.

3. The method according to claim 1 whereby a distance from another contour line is checked in the planning of potential paths as the planning criterion, and the potential path is planned only when this is greater then the processing width.

4. The method according to claim 3 whereby potential paths are planned until the planning criterion is no longer satisfied.

5. The method according to claim 1 whereby a sub-path has a travel direction for the mobile unit prescribed, and whereby adherence of the travel direction in conjunction with the kinematics of the mobile unit is evaluated in the evaluation by the cost function.

6. Method according to claim 1 wherein the potential paths are produced as follows with potential sub-path segments:
   the length of the line segments of the contour line is retained and corresponds to a potential sub-path segment at whose end points maneuvering marks are marked;
   a respective sub-path segment is shifted essentially perpendicular to the contour line by the amount of the processing width; and
   those maneuvering marks of potential sub-path segments that are from a kink of the contour line before their displacement are connected to one another by a further, potential sub-segment.

7. The method according to claim 1 wherein a graph is produced, whereby the potential sub-path segments serve as edges of the graph and the maneuvering marks serve as nodes of the graph.

8. The method according to claim 7 wherein traversed edges are noted as having been cleaned and when no uncleaned edge departs from a node located between these edges, these are combined to form a meta-edge in order to be able to evaluate the entire graph given a constant search depth.

9. The method according to claim 8 wherein the evaluation is implemented with a known graph algorithm.

10. The method according to claim 9 wherein the depth search or the weighted depth search are known graph algorithms.

11. The method according to claim 1 wherein maneuvering marks in the form of a configuration as reference mark are employed at the mobile unit and the alignment thereof.

12. A path planning method for a mobile unit for surface processing, comprising the steps of:

provided a contour line of the processing surface and at least a contour line of an obstacle to be traveled around within the processing surface in the form of a closed line train composed of straight line sections connected in kinks;

dependent on a width of a surface processing device attached to the mobile unit, first, potential paths with the processing width are planned approximately parallel to the contour lines that allow the mobile unit to guide the surface processing device along the processing strip between the first potential path and the contour line;

in a further planning step, planning second potential paths in a substantially same way as the first potential paths with the first potential paths as contour lines;

dividing the potential paths into potential sub-path segments dependent on a length of kinks in the contour lines between which a respective maneuvering mark is marked;

correcting at least two respective maneuvering marks of immediately adjacent, potential paths by potential sub-path segments; and planning the path from interconnected, potential sub-path segments in that these are weighted with a function into which at least one of the following criteria enters: traversability criterion on the basis of kinematics of the mobile unit, area criterion on the basis of processing strips already traversed in relationship to the overall processing area, and length of the potential sub-path.

* * * * *